United States Patent
Karlsen et al.

(10) Patent No.: US 10,729,981 B1
(45) Date of Patent: Aug. 4, 2020

(54) COMPUTER ARCHITECTURE FOR MATCHING ONLINE USERS FOR AN ONLINE EXPERIENCE

(71) Applicant: Electronic Arts Inc., Redwood City, CA (US)

(72) Inventors: Glen Arne Karlsen, Vancouver (CA); Mark Ryan Waller, San Jose, CA (US); David Turner Weih, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 154 days.

(21) Appl. No.: 15/631,606

(22) Filed: Jun. 23, 2017

(51) Int. Cl.
  *A63F 13/795* (2014.01)
  *G06Q 10/06* (2012.01)
  *G06Q 50/00* (2012.01)

(52) U.S. Cl.
  CPC ....... *A63F 13/795* (2014.09); *G06Q 10/0639* (2013.01); *G06Q 50/01* (2013.01); *A63F 2300/5566* (2013.01)

(58) Field of Classification Search
  CPC .................. A63F 13/12; A63F 13/795; A63F 2300/5566; G07F 17/32; G07F 17/3276; G06Q 10/0639; G06Q 50/01
  See application file for complete search history.

(56) References Cited

U.S. PATENT DOCUMENTS

| | | | |
|---|---|---|---|
| 6,641,481 B1* | 11/2003 | Mai | A63F 13/12 463/29 |
| 2008/0242420 A1* | 10/2008 | Graepel | A63F 13/12 463/42 |
| 2014/0228108 A1* | 8/2014 | Bruno, Jr. | G06F 12/00 463/29 |
| 2017/0259178 A1* | 9/2017 | Aghdaie | A63F 13/795 |
| 2017/0282082 A1* | 10/2017 | Hubbard | G06Q 50/00 |

* cited by examiner

*Primary Examiner* — Chris Parry
*Assistant Examiner* — Steven C Nguyen
(74) *Attorney, Agent, or Firm* — McDermott Will & Emery LLP

(57) ABSTRACT

Methods for matching online users in a networked interactive entertainment simulation are provided. In one aspect, a method includes receiving a user request for a user for joining an online session of the simulation. The user request is associated with a set of criteria for matching the user with other online users. An available population of users and a moving average of elapsed time to match for other users are determined. The set of criteria is adjusted based on the available population and the moving average of elapsed time. Finding other online users matching the adjusted set of criteria is initiated. The online session is started based on found online users. Systems and machine-readable media are also provided.

19 Claims, 6 Drawing Sheets

COMPUTER ARCHITECTURE FOR MATCHING ONLINE USERS FOR AN ONLINE EXPERIENCE

TECHNICAL FIELD

The present disclosure generally relates to computer architecture for matching online users for an online experience, and more specifically to computer architecture for matching online users in an interactive electronic simulation. The present disclosure describes improved resource utilization to improve matchmaking for online users without requiring significant extra processing or hardware.

BACKGROUND

Video games, such as sports video games, first person shooter games or other online games, often have a multi-player mode allowing multiple game players ("users") to connect online to interact with one another in the video game. Players may select a game mode they would like to play, and the video game finds other players looking to play the same game mode. The game will attempt to match players ("matchmaking") based on their respective skill levels, in order to provide a fair and engaging experience for the players. However, a population of online players fluctuates over time. When the population is small, the likelihood of finding matches may decrease, which may increase a time to match players. Players may need to wait longer to find matches when the population is small.

The description provided in the background section should not be assumed to be prior art merely because it is mentioned in or associated with the background section. The background section may include information that describes one or more aspects of the subject technology.

SUMMARY

The disclosed system provides for matching online users for an online experience based on a set of criteria. The disclosed system adjusts the set of criteria based on the population of online users.

According to certain aspects of the present disclosure, a system for improving matching online users for an online experience is provided. The system includes a memory including instructions and a processor configured to execute the instructions. The processor is configured to execute the instructions to receive a user request for joining an online session of the online experience. The user request is associated with a set of criteria for matching with other online users. The set of criteria includes a skill range associated with a skill level of the user. The processor is configured to execute the instructions to initiate finding one or more online users matching the set of criteria. The processor is configured to measure an elapsed time for the finding, to determine an available population of users, and to determine a moving average of elapsed time to match for other online users. If the elapsed time satisfies a timeout threshold before the finding is complete, the processor is configured to adjust the set of criteria based on the available population and the moving average of elapsed time, wherein the skill range is adjusted. The processor is configured to initiate finding one or more other online users matching the adjusted set of criteria, and start the online session based on the found one or more other online users.

According to certain aspects of the present disclosure, a non-transitory machine-readable storage medium including machine-readable instructions for causing a processor to execute a method for improving matching online users for an online experience is provided. The method includes receiving a user request for joining an online session of the online experience. The user request is associated with a set of criteria for matching with other online users. The method includes initiating finding one or more online users matching the set of criteria. The method includes measuring an elapsed time for the finding, determining an available population of users, and determining a moving average of elapsed time to match for other online users. The method includes adjusting the set of criteria based on the available population and the moving average of elapsed time, if the elapsed time satisfies a timeout threshold before the finding is complete. The method includes initiating finding one or more other online users matching the adjusted set of criteria, and starting the online session based on the found one or more other online users.

According to certain aspects of the present disclosure, computer-implemented method for improving matching online users for an online experience is provided. The method includes receiving a user request for joining an online session of the online experience. The user request is associated with a set of criteria for matching with other online users. The method includes determining an available population of users, and determining a moving average of elapsed time to match for other online users. The method includes adjusting the set of criteria based on the available population and the moving average of elapsed time. The method includes initiating finding one or more other online users matching the adjusted set of criteria, and starting the online session based on the found one or more other online users.

According to certain aspects of the present disclosure, a system for improving matching online users for an online experience is provided. The system includes means for receiving a user request for joining an online session of the online experience. The user request is associated with a set of criteria for matching with other online users. The system includes means for determining an available population of users and determining a moving average of elapsed time to match for other online users. The means for determining is further configured to adjust the set of criteria based on the available population and the moving average of elapsed time. The means for receiving is further configured to initiate finding one or more other online users matching the adjusted set of criteria, and start the online session based on the found one or more other online users.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
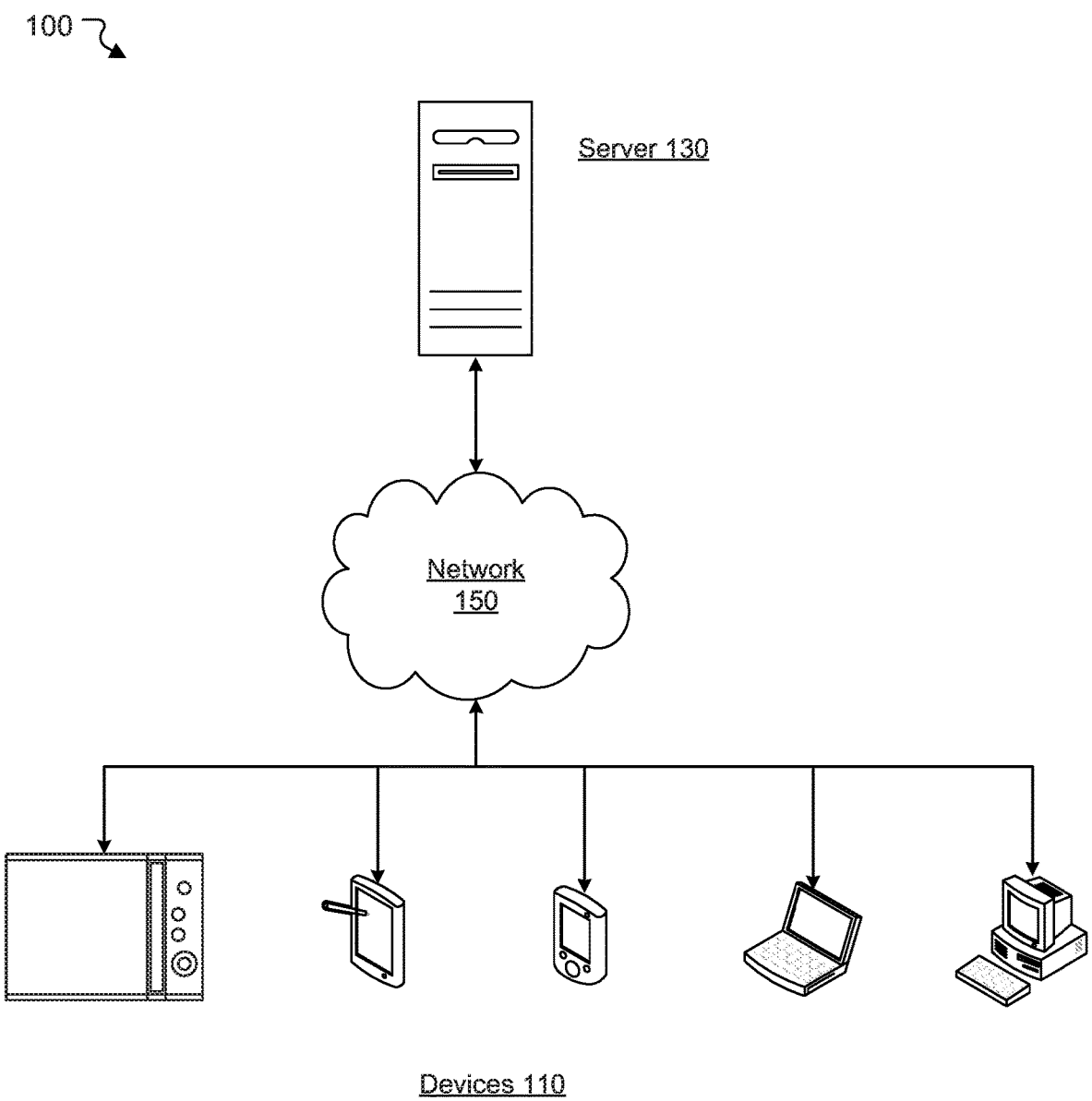
FIG. 1 illustrates an example architecture for matching online users in a networked interactive entertainment simulation according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for matching online users in a networked interactive entertainment simulation. The disclosed system performs matchmaking which takes into account current characteristics of the population of online users for the simulation ("population aware matchmaking.") For example, matchmaking criteria is adjusted based on the number of people looking for a match or the average length of time it takes for players to find a match.

The disclosed system addresses a technical problem tied to computer technology and arising in the realm of computer networks, namely the technical problem of efficient and accurate matching of online users for a networked interactive entertainment simulation. The disclosed system solves this technical problem by a technical solution of introducing a data feedback loop. The disclosed system uses feedback of the current population of players waiting to be matched to adjust matchmaking criteria. A selectivity of the matchmaking criteria is adjusted based on the current population to increase the likelihood of finding a match. The disclosed system is thus able to find matches more quickly, or is able to find better matches in a similar amount of time as conventional systems. The disclosed system requires less processing and resources as the selectivity is adjusted to improve the likelihood of finding matches, rather than utilizing resources to find matches which may not be available. The disclosed system reduces an amount of network traffic by reducing an amount of requests sent by users to retry matchmaking when the initial matchmaking fails. This may further lead to reduced power consumption in the disclosed system, for both server-side and client-side machines.

While many examples are provided herein in the context of a video game, the principles of the present disclosure contemplate other types of online experiences as well. For example, chatting, video chatting, server offloading, military and other non-entertainment simulations, and other online interactions involving matching users are all considered within the scope of the present disclosure.

Example System Architecture

FIG. 1 illustrates an example architecture 100 for matching online users in a networked interactive entertainment simulation. The architecture 100 includes one or more servers 130 and devices 110 connected over a network 150.

One of the many servers 130 is configured to host application data, such as application data for a simulation or video game. For purposes of load balancing, multiple servers 130 can host the application data. The server 130 may further be configured to host simulations for multiple devices 110. For example, the server 130 may host a multiplayer simulation for multiple devices 110 to connect to, such that the multiple devices 110 experience the same simulation at approximately the same time.

The devices 110 include one or more computing devices. The devices 110 may include devices capable of running a simulation engine, such as a sports game, for simulating sporting events, a first person shooter (FPS) game, a first person video game, a driving simulator game, an open world (or free roam or sandbox) game, or any other type of simulation or game having objects move according to simulated real-world physics. For example, the devices 110 may include stationary video game consoles, tablets, mobile devices, laptop computers, desktop computers, and/or other devices capable of running a video game.

The disclosed system uses application data to coordinate the simulations across the devices 110. The server 130 sends the portions of the application data to one or more devices 110, which uses the application data to run similar instances of the simulation. As such, the disclosed system can, for example, create a consistent simulation across the devices 110.

In addition, according to certain aspects of the disclosure, the simulation may be hosted locally, for example on one of the devices 110, or between two or more devices 110 such that application data is shared between the devices 110 rather than being generated by the server 130.

The servers 130 can be any device having an appropriate processor, memory, and communications capability for hosting application data. The devices 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Simulation of Character Movement

Figure 2:
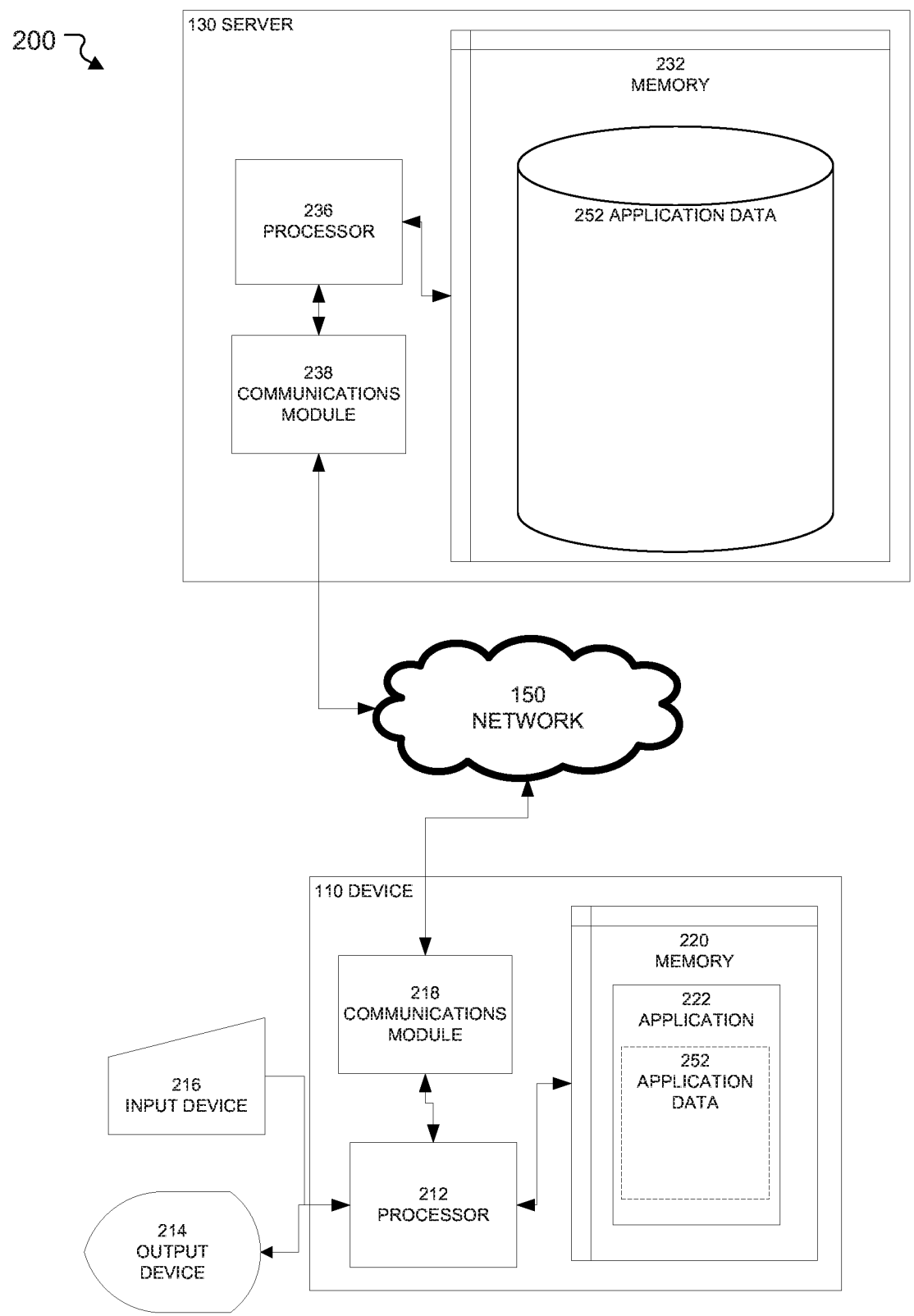
FIG. 2 is a block diagram illustrating the example device and server from the architecture of FIG. 1, according to certain aspects of the disclosure.

FIG. 2 is a block diagram 200 illustrating an example server 130 and device 110 in the architecture 100 of FIG. 1 according to certain aspects of the disclosure.

The device 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes application data 252. The application data 252 corresponds to data for hosting a simulation, such as a multiplayer video game. The application data 252 may include data for generating the simulation, such as models of characters, models of the environment (e.g., maps), textures, environment variables and parameters, and other data for generating the simulation. Although the present disclosure describes the simulation as a multiplayer video game, in other implementations the simulation may allow spectators to view the simulation without controlling objects or characters within the simulation.

The processor 236 of the server 130 is configured to execute instructions, such as instructions physically coded into the processor 236, instructions received from software in memory 240, or a combination of both. For example, the processor 236 of the server 130 executes instructions to send at least a portion of the application data 252 to one or more devices 110.

The processor 236 executes instructions from the application 222 causing the processor 236 to receive a user request for a user for joining an online session of the networked interactive entertainment experience. For example, the user may have indicated interest in joining an online session. The user request further signifies that the user is part of the population of users looking for matches. The user request is associated with a set of criteria for matching with other online users. For example, the set of criteria may include a skill range associated with a skill level of the user. The user may have a skill level associated with the video game, and the skill range corresponds to a range such that the user is matched with other users having a similar skill level. The skill level may be determined by the user's actions within the video game, for example completing certain achievements or milestones, gaining experience points within the video game, or other requirements as established by the video game. Other criteria may include game parameters, such as type of game or game mode. The set of criteria may also include geographic or regional limitations, latency limitations, friend lists for finding specific users to match with, number of players for the game, etc.

Executing the instructions also causes the processor 236 to determine an available population of users. The available population may be represented by a number of peak simultaneous users (PSU). The number of PSU corresponds to a current number of users who are online and logged into the video game, have requested matchmaking, have not started a session already and are thus available for matching. Users who are currently playing in a multiplayer game, or have not otherwise indicated interest in finding a match, are not considered available. The number of PSU may correspond to worldwide users, or users within a specific region. Geographic limitations may be a part of the set of criteria such that the number of PSU is determined from users within the geographic limitations. Thus, the number of PSU indicates a current population of users. The PSU may be used to determine a matchmaking rate ("MMR"). The MMR corresponds to a number of people, which may be derived from the PSU, looking for a matchmaking experience over a specified timeframe, such as the last 5 minutes. Although PSU and MMR are not identical, both PSU and MMR represent the available population, such as a size or number of the available matchmaking users, and may be used interchangeably for the inventive concepts described herein.

Executing the instructions also causes the processor 236 to determine a moving average of elapsed time to match for other online users. The amount of time needed for users to find matches is monitored such that the moving average indicates how much time an average user needs to find a match. For example, if 10 seconds pass from the time a user requests matchmaking to the time a match is found, the 10 seconds is averaged with the respective times of other users. The moving average may have a window of, for example, 10 minutes such that the times-to-match recorded within the last 10 minutes are used to determine the moving average.

Executing the instructions also causes the processor 236 to adjust the set of criteria based on the available population and the moving average of elapsed time. Based on the available population, the set of criteria may be expanded or contracted to increase a likelihood of finding a match in the population as well as reduce a time to find a match. For example, when the available population is less than a lower population threshold, the skill range may be expanded. The population is considered small, and expanding the skill range reduces selectivity to increase the likelihood of finding a match in the small population. When the available population is greater than an upper population threshold, the skill range may be contracted. The population is considered large, thus the likelihood of finding a match is relatively high. Contracting the skill range increases the selectivity in order to produce better matches. Although increasing the selectivity reduces the likelihood of finding a match, when the likelihood starts relatively high, this reduction in the likelihood may be tolerable. The available population may be determined by the number of PSU, and compared against a lower PSU threshold, corresponding to the lower population threshold, and/or an upper PSU threshold, corresponding to the upper population threshold. The available population may be determined by the MMR, and compared against a lower MMR threshold, corresponding to the lower population threshold, and/or an upper MMR threshold, corresponding to the upper population threshold. In certain implementations, the both the number of PSU and the MMR may be evaluated.

When the moving average of elapsed time is greater than an upper time threshold, the skill range may be expanded. The time-to-match is too great such that the user's experience is diminished from waiting too long for matches. Expanding the skill range decreases selectivity to increase the likelihood of finding a match, which in turn reduces the time-to-match. When the moving average of elapsed time is less than a lower time threshold, the skill range may be contracted. The time-to-match is short enough that an increase in time-to-match would not diminish the user's experience. Contracting the skill range increases selectivity, which may produce better matches. The set of criteria may be adjusted based on an expected number of PSU and/or a rate of online users becoming available for matching.

Executing the instructions also causes the processor 236 to initiate finding one or more other online users matching the adjusted set of criteria. Executing the instructions also causes the processor 236 to measure an elapsed time for finding the other online users. Executing the instructions also causes the processor 236 to readjust the set of criteria, if the elapsed time satisfies a timeout threshold before the finding is complete. For example, the set of criteria may be expanded. The timeout threshold corresponds to an acceptable amount of wait time for the user before the user's experience is diminished. When the timeout threshold is reached without a match, the set of criteria is expanded to decrease selectivity. Decreasing selectivity increases the likelihood of finding a match, which reduces a time-to-match such that in the next iteration of finding matches, the timeout threshold is not reached. Executing the instructions also causes the processor 236 start the online session based on the found one or more other online users. For example, the requested game mode of the video game is initiated with the matched users.

Although FIG. 2 depicts the application data 252 in the memory 232 of the server 130, in other implementations the memory 220 of the device 110 may include the application data 252 or local copies thereof.

The device 110 includes a processor 212, the communications module 218, and the memory 220 that includes the application 222. The application 222 may be a simulation engine, or software capable of displaying graphics, such as a video game. The device 110 also includes an input device 216, such as a keyboard, mouse, touchscreen and/or game controller, and an output device 214, such as a display. The processor 212 of the device 110 is configured to execute instructions, such as instructions physically coded into the processor 212, instructions received from software in memory 220, or a combination of both. The processor 212 of the device 110 executes instructions from the application 222 causing the processor 212 to detect a user request for joining an online session of an online experience, and to send the request to the server 130. Executing the instructions also causes the processor 212 to run the online session based on instructions from the server 130, for example after the server 130 finds matches and starts the online session.

Figure 3:
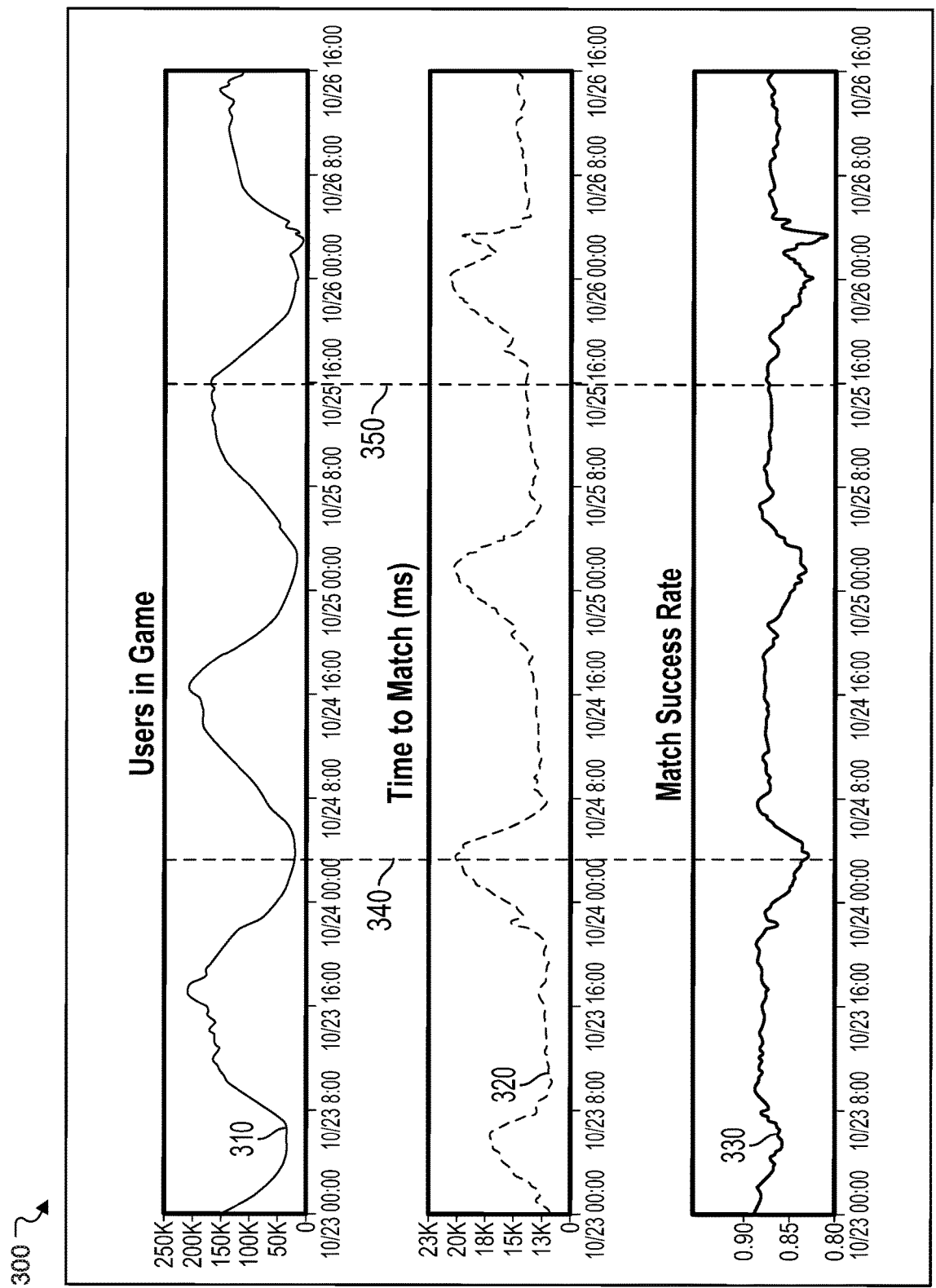
FIG. 3 is a graph illustrating correlating peak simultaneous users (PSU), time-to-match (TTM), and matching success rate according to certain aspects of the disclosure.

FIG. 3 shows a graph 300 of a number-of-users curve 310, a time-to-match curve 320, and a match-success-rate curve 330 for conventional matchmaking. The number-of-users curve 310 displays a number of users in the game over time. At any given point in time, the number-of-users curve 310 shows the number of PSU. Larger values correspond to larger populations. The number-of-users curve 310 fluctuates over time, for example reaching local maximums during times when many users are playing online and local minimums during less popular times. In addition, as the game ages, the population may decrease as users may no longer play the game.

The time-to-match curve 320 displays an average time needed for users to find matches, over the same time period as the number-of-users curve 310. Larger values correspond to longer times needed to find matches.

The match-success-rate curve 330 displays a success rate percentage of successful matches to attempts, over the same time period as the number-of-users curve 310. Larger values correspond to higher success rates.

As seen in FIG. 3, there tends to be a correlation between the number of PSU, time-to-match, and success rate. Conventional matchmaking rules are generally configured without regard to the size of the population. Thus, the larger the population, the more possible matches are available such that better (e.g., matching closely with the set of criteria) and quicker matches are found. Time 350 corresponds to a time of day during which the number of PSU is high. The large population results in more possible matches, thus a high likelihood of success. The high success rate generally results in shorter time-to-match.

Time 340 corresponds to a time of day during which the number of PSU is low. The set of criteria, however, remains the same as with the time 350. When the population is small, the number of possible matches is small, resulting in longer times-to-match. Because the number of possible matches is small, the success rate is also low. In addition, when no matches are found, the same criteria are reused for the next attempt to find matches.

Adjusting the set of criteria based on the current population allows for improved matchmaking. For example, when the population is small, the criteria may be expanded (e.g., made less selective) in order to increase the likelihood of successful matching, and to reduce times-to-match. When the population is large, the criteria may be contracted (e.g., made more selective) to find better matches, without unreasonably extending times-to-match.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4A:
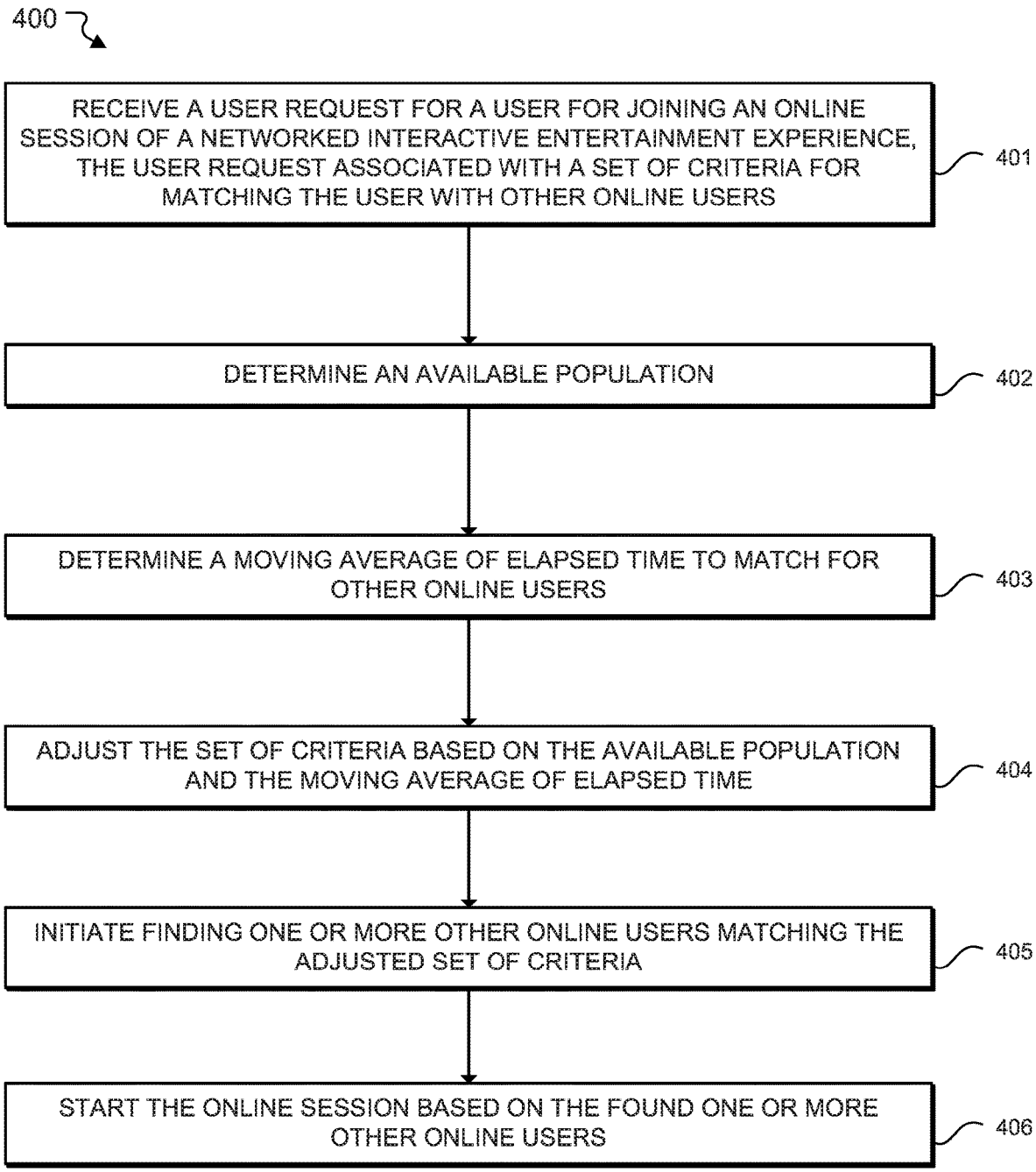
FIG. 4A illustrates an example process for matching online users in a networked interactive entertainment simulation according to certain aspects of the disclosure.

FIG. 4A illustrates an example process 400 for improving matching online users for an online experience, using the example device 110 of FIG. 2. While FIG. 4A is described with reference to FIG. 2, it should be noted that the process steps of FIG. 4A may be performed by other systems. In addition, the process 400 is not limited to the specific order of steps presented in FIG. 4A.

The process 400 begins by proceeding to step 401 when, for example the server 130 receives a user request for joining an online session of an online experience. The device 110 may send the user request to the server 130. For example, the user may be playing a game on the device 110, and selects a multiplayer game. The user request is associated with a set of criteria for matching with other online users. At least a portion of the set of criteria may be sent from the device 110 to the server 130. For example, gameplay parameters such as type of game which are selected by the user are sent from the device 110. Other criteria may be available to the server 130. For example, the server 130 may maintain skill levels for each user of the game. Predetermined criteria, such as a skill range, and geographic or regional limitations, may be available to the server 130 without input from the device 110. The user's skill level may be a number, such as a number from 1-100, based on the video game's determination of the user's skill in the game. For example, the video game may monitor the user's achievements within the game, such as achieving milestones, collecting experience points, amount of time played, etc. The skill range, which may be an offset such as +/−10, allows for matching the user with other users having skill levels falling within the range. Thus, users of similar skill levels may be matched. The geographic limitations may limit how far apart the users are, such that the game does not experience latency issues.

At step 402, the server 130 determines an available population of users. The available population is based on online users who are looking for matches and may be determined by measuring a number of PSU, an MMR, and/or other population metrics. Online users who are already playing a multiplayer session, or who have not yet indicated their desire to join a session, are not included. The number of PSU may be further restricted to online users within geographic limitations described above, and/or other criteria in the set of criteria.

At step 403, the server 130 determines a moving average of elapsed time to match for other online users. As each online user is successfully matched, the respective time-to-match is aggregated into the moving average. The moving average represents a time-to-match that an average user is currently experiencing.

At step 404, the server 130 adjusts the set of criteria based on the available population and the moving average of elapsed time. The set of criteria may be contracted when the available population and the moving average of elapsed time indicate that better matches may be found without unreasonably extending the time-to-match. For example, if the available population (e.g., a number of PSU and/or an MMR) is greater than an upper population threshold (e.g., an upper PSU threshold and/or an upper MMR threshold), the set of criteria is contracted. In the example of the skill range, the skill range may be contracted from +/−10 to +/−5. If the moving average of elapsed time is less than a lower time threshold, the set of criteria is contracted. In this scenario, the likelihood of success starts higher, thus affording the more restrictive criteria to find better matches without requiring prohibitively more time to find matches. In certain implementations, if both the available population is greater than the upper population threshold and the moving average of elapsed time is less than the lower time threshold, the set of criteria may be further contracted.

If the available population (e.g., the number of PSU and/or the MMR) is less than a lower population threshold (e.g., a lower PSU threshold and/or a lower MMR threshold), the set of criteria is expanded. For example, the skill range may be expanded from +/−10 to +/−15. If the moving average of elapsed time is greater than an upper time threshold, the set of criteria is expanded. In this scenario, the likelihood of success starts lower, thus to improve the likelihood of success, the set of criteria is expanded. Improving the likelihood of success may reduce the moving average of elapsed time. In certain implementations, if both the available population is less than the lower population threshold and the moving average of elapsed time is greater than the upper time threshold, the set of criteria may be further expanded.

The amount of expansion and/or contraction of criteria may be based on predetermined values. For example, there may be a series of thresholds for the available population and/or the moving average of elapsed time, with a predetermined adjustment value associated with each threshold. Alternatively, the amount of expansion and/or contraction may be based on curves associated with the available population and/or the moving average of elapsed time.

The amount of expansion and/or contraction may be similar for all users in the population, or may vary based on each user. For example, users having high skill levels may be more interested in finding better matches rather than faster matches. The adjustment may be small in order to prioritize better matches over faster times-to-match. Users having low skill levels may be more interested in finding faster matches rather than better matches. The adjustment may be large in order to prioritize faster times-to-match.

In certain implementations, the amount of expansion and/or contraction may be based on predictive calculations. The server 130 may determine a rate of online users becoming available for matching. For instance, the server 130 may monitor how many users are joining the population as well as leaving the population. If the rate is greater than a threshold rate, the server 130 may expand the set of criteria. If the rate is less than the threshold rate, the server 130 may contract the set of criteria. The server 130 may determine an expected number of PSU for the current conditions. For example, based on historical data of the number of PSU, the moving average of elapsed time, and/or the rate of online users becoming available for matching, the server 130 may determine that a rise or drop in the number of PSU will be expected, and may preemptively adjust the set of criteria as needed. In addition, the amount of expansion and/or contraction may be determined from prior adjustments. For instance, if an adjustment made for a given number of PSU and/or moving average of elapsed time did not significantly increase the success rate of matches, the server 130 may make a different adjustment, rather than making the same adjustment as before.

At step 405, the server 130 initiates finding one or more other online users matching the adjusted set of criteria. The server 130 searches through the population to find online users which match all of the set of criteria. If a timeout threshold is reached before finding matches, the finding may be reinitiated. The set of criteria may be readjusted, for example by repeating steps 402-404. In certain implementations, the finding may not be reinitiated, for example to give the user a chance to change the user request or to cancel the user request.

At step 406, the server 130 starts the online session based on the found one or more other online users. When users matching the set of criteria are found, the server 130 starts the online session with the matching users. The server 130 accordingly instructs the respective device 110 of each matching user to start the online session.

Although the process 400 describes a single iteration of matchmaking, the matchmaking may include additional criteria, or may be adjusted based on additional parameters.

Figure 4B:
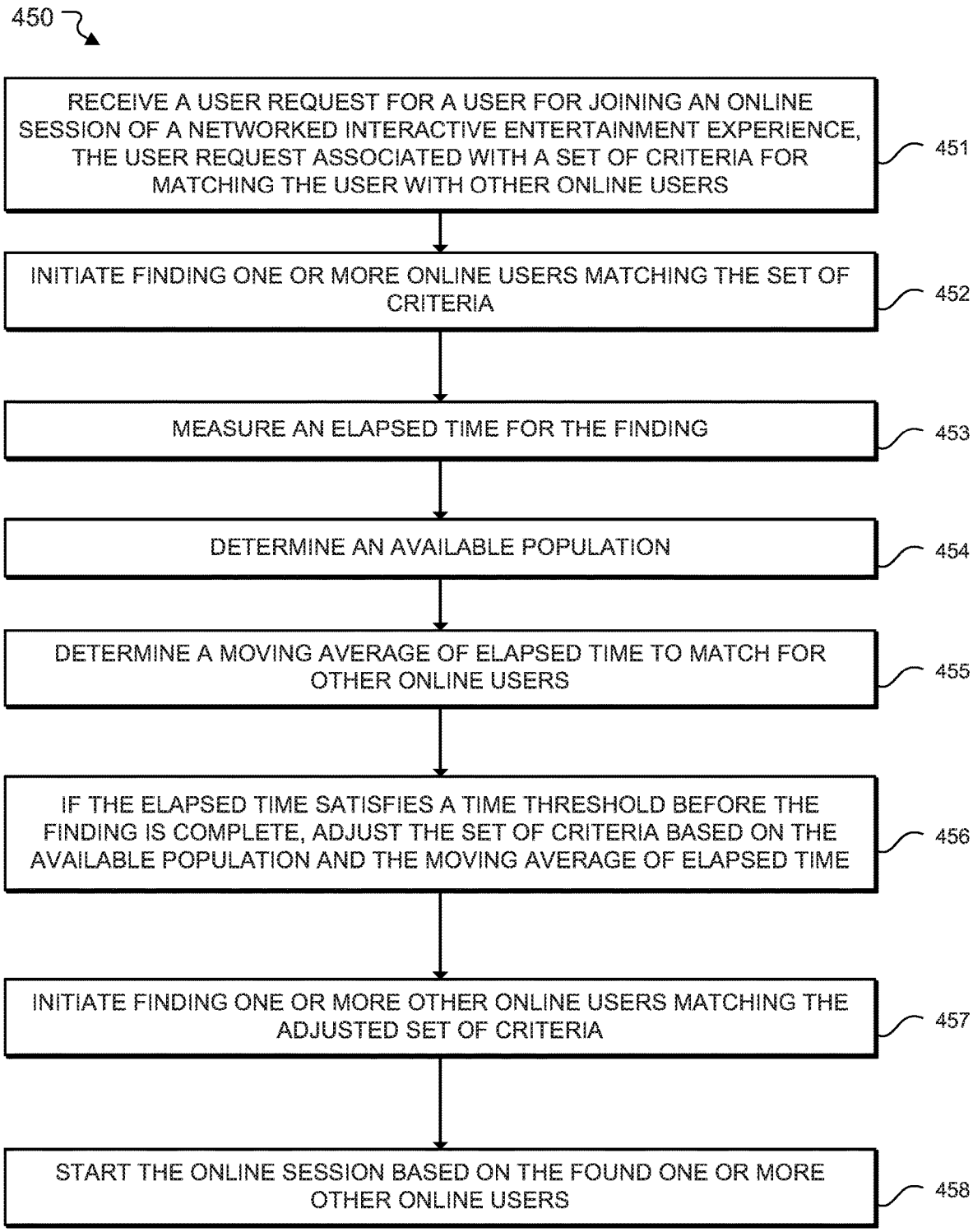
FIG. 4B illustrates another example process for matching online users in a networked interactive entertainment simulation according to certain aspects of the disclosure.

FIG. 4B illustrates an example process 450 for improving matching online users for an online experience, using the example device 110 of FIG. 2. While FIG. 4B is described with reference to FIG. 2, it should be noted that the process steps of FIG. 4B may be performed by other systems. In addition, the process 450 is not limited to the specific order of steps presented in FIG. 4B.

The process 450 begins by proceeding to step 451 when, for example the server 130 receives a user request for joining an online session of an online experience. The device 110 may send the user request to the server 130. For example, the user may be playing a game on the device 110, and selects a multiplayer game. The user request is associated with a set of criteria for matching with other online users. At least a portion of the set of criteria may be sent from the device 110 to the server 130. For example, gameplay parameters such as type of game which are selected by the user are sent from the device 110. Other criteria may be available to the server 130. For example, the server 130 may maintain skill levels for each user of the game. Predetermined criteria, such as a skill range, and geographic or regional limitations, may be available to the server 130 without input from the device 110. The user's skill level may be a number, such as a number from 1-100, based on the game's determination of the user's skill in the game. The skill range, which may be an offset such as +/−10, allows for matching the user with other users having skill levels falling within the range. Thus, users of similar skill levels may be matched. The geographic limitations may limit how far apart the users are, such that the game does not experience latency issues.

At step 452, the server 130 initiates finding one or more online users matching the set of criteria. The server 130 may use the default set of criteria for this search. In certain implementations, the server 130 may adjust the set of criteria, for example as explained above with the process 400.

At step 453, the server 130 measures an elapsed time for the finding. The server 130 determines how long the search is currently taking. For example, the server 130 may record a timestamp of the user's request from step 451. As the server 130 conducts finding other online users, the server 130 may periodically compare a current time to the timestamp to determine the elapsed time.

At step 454, the server 130 determines an available population of users. The available population is based on online users who are looking for matches and may be determined by measuring a number of PSU, an MMR, and/or other population metrics. Online users who are already playing a multiplayer session, or who have not yet indicated their desire to join a session are not included. The number of PSU may be further restricted to online users within geographic limitations described above, and/or other criteria in the set of criteria.

At step 455, the server 130 determines a moving average of elapsed time to match for other online users. As each online user is successfully matched, the respective time-to-match is aggregated into the moving average. The moving average represents a time-to-match that an average user is currently experiencing.

At step 456, if the elapsed time satisfies a timeout threshold before the finding is complete, the server 130 adjusts the set of criteria based on the available population and the moving average of elapsed time. The timeout threshold corresponds to a predetermined value for when to stop a search.

The set of criteria may be contracted when the available population and the moving average of elapsed time indicate that better matches may be found without unreasonably extending the time-to-match. For example, if the available population (e.g., a number of PSU and/or an MMR) is greater than an upper population threshold (e.g., an upper PSU threshold and/or an upper MMR threshold), the set of criteria is contracted. In the example of the skill range, the skill range may be contracted from +/−10 to +/−5. If the moving average of elapsed time is less than a lower time threshold, the set of criteria is contracted. In this scenario, the likelihood of success starts higher, thus affording the more restrictive criteria to find better matches without requiring prohibitively more time to find matches. In certain implementations, if both the available population is greater than the upper population threshold and the moving average of elapsed time is less than the lower time threshold, the set of criteria may be further contracted.

If the available population (e.g., the number of PSU and/or the MMR) is less than a lower population threshold (e.g., a lower PSU threshold and/or a lower MMR threshold), the set of criteria is expanded. For example, the skill range may be expanded from +/−10 to +/−15. If the moving average of elapsed time is greater than an upper time threshold, the set of criteria is expanded. In this scenario, the likelihood of success starts lower, thus to improve the likelihood of success, the set of criteria is expanded. Improving the likelihood of success may reduce the moving average of elapsed time. In certain implementations, if both the available population is less than the lower population threshold and the moving average of elapsed time is greater than the upper time threshold, the set of criteria may be further expanded.

The amount of expansion and/or contraction of criteria may be based on predetermined values. For example, there may be a series of thresholds for the available population and/or the moving average of elapsed time, with a predetermined adjustment value associated with each threshold. Alternatively, the amount of expansion and/or contraction may be based on curves associated with the available population and/or the moving average of elapsed time.

The amount of expansion and/or contraction may be similar for all users in the population, or may vary based on each user. For example, users having high skill levels may be more interested in finding better matches rather than faster matches. The adjustment may be small in order to prioritize better matches over faster times-to-match. Users having low skill levels may be more interested in finding faster matches rather than better matches. The adjustment may be large in order to prioritize faster times-to-match.

In certain implementations, the amount of expansion and/or contraction may be based on predictive calculations. The server 130 may determine a rate of online users becoming available for matching. For instance, the server 130 may monitor how many users are joining the population as well as leaving the population. If the rate is greater than a threshold rate, the server 130 may expand the set of criteria. If the rate is less than the threshold rate, the server 130 may contract the set of criteria. The server 130 may determine an expected number of PSU for the current conditions. For example, based on historical data of the number of PSU, the moving average of elapsed time, and/or the rate of online users becoming available for matching, the server 130 may determine that a rise or drop in the number of PSU will be expected, and may preemptively adjust the set of criteria as needed. In addition, the amount of expansion and/or contraction may be determined from prior adjustments. For instance, if an adjustment made for a given number of PSU and/or moving average of elapsed time did not significantly increase the success rate of matches, the server 130 may make a different adjustment, rather than making the same adjustment as before.

At step 457, the server 130 initiates finding one or more other online users matching the adjusted set of criteria. The server 130 searches through the population to find online users which match all of the set of criteria. If the timeout threshold is reached before finding matches, the finding is reinitiated. The set of criteria may be readjusted, for example by repeating steps 453-456.

At step 458, the server 130 starts the online session based on the found one or more other online users. When users matching the set of criteria are found, the server 130 starts the online session with the matching users. The server 130 accordingly instructs the respective device 110 of each matching user to start the online session.

Although the process 450 describes a single iteration of matchmaking, the matchmaking may include additional criteria, or may be adjusted based on additional parameters.

Hardware Overview

Figure 5:
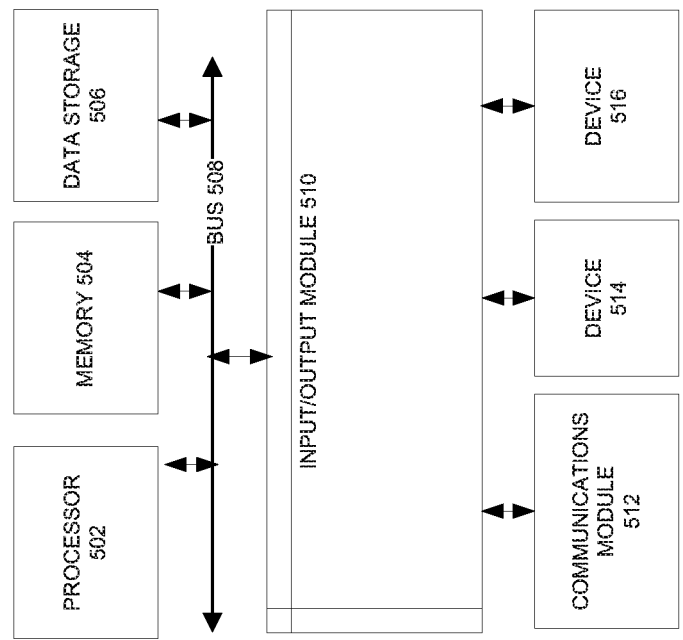
FIG. 5 is a block diagram illustrating an example computer system with which the devices and server of FIG. 2 can be implemented.

FIG. 5 is a block diagram illustrating an example computer system 500 with which the device 110 and server 130 of FIGS. 1 and 2 can be implemented. In certain aspects, the computer system 500 may be implemented using hardware or a combination of software and hardware, either in a dedicated server, or integrated into another entity, or distributed across multiple entities.

Computer system 500 (e.g., device 110 and server 130) includes a bus 508 or other communication mechanism for communicating information, and a processor 502 (e.g., processor 212 and 236) coupled with bus 508 for processing information. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 232 or 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216 and/or output device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., communications modules 238 and/or 218) include networking interface cards, such as Ethernet cards and modems.

The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the Internet example, a server might transmit a requested code for an application program through Internet, the ISP, the local network and communications module 512. The received code may be executed by processor 502 as it is received, and/or stored in data storage device 506 for later execution.

In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the device 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A system for matching online users in a networked interactive entertainment simulation, the system comprising:
   a memory comprising instructions;
   a processor configured to execute the instructions to:
      receive a user request for a user for joining an online session of the simulation, the user request associated with a set of criteria for matching the user with other online users, wherein the set of criteria comprises a skill range associated with a skill level of the user;
      initiate finding one or more online users matching the set of criteria;
      measure an elapsed time for the finding;
      determine an available population of users and a moving average of elapsed time, the moving average of elapsed time comprising an average of the elapsed time with elapsed times for other online users;
      if the elapsed time satisfies a timeout threshold before the finding is complete, adjust the set of criteria based on predictive calculations, the predictive calculations based on the available population, the moving average of elapsed time, and a rate of online users becoming available for matching;
      initiate finding one or more other online users matching the adjusted set of criteria; and
      start the online session based on the found one or more other online users.

2. The system of claim 1, wherein the skill range is expanded when the available population is less than a lower population threshold.

3. The system of claim 1, wherein the skill range is contracted when the available population is greater than an upper population threshold.

4. The system of claim 1, wherein the skill range is expanded when the moving average of elapsed time is greater than an upper time threshold.

5. The system of claim 1, wherein the skill range is contracted when the moving average of elapsed time is less than a lower time threshold.

6. A non-transitory machine-readable storage medium comprising machine-readable instructions for causing a processor to execute a method for matching online users in a networked interactive entertainment simulation, the method comprising:
   receiving a user request for a user for joining an online session of the simulation, the user request associated with a set of criteria for matching the user with other online users;
   initiating finding one or more online users matching the set of criteria;
   measuring an elapsed time for the finding;
   determining an available population of users and a moving average of elapsed time, the moving average of elapsed time comprising an average of the elapsed time with elapsed times for other online users;
   if the elapsed time satisfies a timeout threshold before the finding is complete, adjusting the set of criteria based on predictive calculations, the predictive calculations based on the available population, the moving average of elapsed time, and a rate of online users becoming available for matching;
   initiating finding one or more other online users matching the adjusted set of criteria; and
   starting the online session based on the found one or more other online users.

7. The non-transitory machine-readable storage medium of claim 6, wherein the set of criteria includes a skill range associated with a skill level of the user.

8. The non-transitory machine-readable storage medium of claim 7, wherein the skill range is expanded when the available population is less than a lower population threshold.

9. The non-transitory machine-readable storage medium of claim 7, wherein the skill range is contracted when the available population is greater than an upper population threshold.

10. The non-transitory machine-readable storage medium of claim 7, wherein the skill range is expanded when the moving average of elapsed time is greater than an upper time threshold.

11. The non-transitory machine-readable storage medium of claim 7, wherein the skill range is contracted when the moving average of elapsed time is less than a lower time threshold.

12. A computer-implemented method for matching online users in a networked interactive entertainment simulation, the method comprising:
   receiving a user request for a user for joining an online session of the simulation, the user request associated with a set of criteria for matching the user with other online users;
   determining an available population of users and a moving average of elapsed time, the moving average of elapsed time comprising an average of the elapsed time with elapsed times for other online users;
   adjusting the set of criteria based on predictive calculations, the predictive calculations based on the available population, the moving average of elapsed time, and a rate of online users becoming available for matching;
   initiating finding one or more other online users matching the adjusted set of criteria; and
   starting the online session based on the found one or more other online users.

13. The computer-implemented method of claim 12, further comprising:
   measuring an elapsed time for the finding;
   if the elapsed time satisfies a timeout threshold before the finding is complete, readjusting the set of criteria based on the available population, the moving average of elapsed time, and the rate of online users becoming available for matching; and initiating finding one or more online users matching the readjusted set of criteria.

14. The computer-implemented method of claim 12, wherein the set of criteria includes a skill range associated with a skill level of the user.

15. The computer-implemented method of claim 14, wherein the skill range is expanded when the available population is less than a lower population threshold.

16. The computer-implemented method of claim 14, wherein the skill range is contracted when the available population is greater than an upper population threshold.

17. The computer-implemented method of claim 14, wherein the skill range is expanded when the moving average of elapsed time is greater than an upper time threshold.

18. The computer-implemented method of claim 14, wherein the skill range is contracted when the moving average of elapsed time is less than a lower time threshold.

19. The computer-implemented method of claim 12, wherein adjusting the set of criteria is further based on an expected number of peak simultaneous users.

* * * * *